US006228812B1

(12) United States Patent
Dawson et al.

(10) Patent No.: US 6,228,812 B1
(45) Date of Patent: May 8, 2001

(54) COMPOSITIONS AND METHODS FOR SELECTIVE MODIFICATION OF SUBTERRANEAN FORMATION PERMEABILITY

(75) Inventors: Jeffrey C. Dawson; Hoang V. Le, both of Spring; Subramanian Kesavan, Woodlands, all of TX (US)

(73) Assignee: BJ Services Company, Houston, TX (US)

(*) Notice: Subject to any disclaimer, the term of this patent is extended or adjusted under 35 U.S.C. 154(b) by 0 days.

(21) Appl. No.: 09/286,179

(22) Filed: Apr. 5, 1999

Related U.S. Application Data
(60) Provisional application No. 60/111,897, filed on Dec. 10, 1998.

(51) Int. Cl.[7] .............................. C09K 3/00; E21B 33/13

(52) U.S. Cl. ........................ 507/221; 507/225; 507/226; 166/305.1; 166/295

(58) Field of Search ..................................... 507/118, 221, 507/120, 121, 225, 226; 526/240, 287; 166/305.1, 295

(56) References Cited

U.S. PATENT DOCUMENTS

| | | |
|---|---|---|
| 1,421,706 | 7/1922 | Van Auken Mills . |
| 2,294,078 | 8/1942 | Dow et al. ............................. 166/33 |
| 3,172,470 | 3/1965 | Huitt et al. ............................ 166/29 |
| 3,172,471 | 3/1965 | Warren ................................. 166/33 |
| 3,198,253 | 8/1965 | Holbert ................................ 166/33 |
| 3,302,717 | 2/1967 | West et al. ............................ 166/33 |
| 3,380,529 | 4/1968 | Hendrickson ......................... 166/33 |
| 3,421,585 | 1/1969 | Hurst .................................... 166/42 |
| 3,483,121 | 12/1969 | Jordan ................................ 252/8.55 |
| 3,687,200 | 8/1972 | Routson .............................. 166/275 |
| 3,719,228 | 3/1973 | Carcia ................................ 166/281 |
| 3,723,408 | 3/1973 | Nordgren et al. ............... 260/209 R |
| 3,730,271 | 5/1973 | Gall .................................... 166/294 |
| 3,760,881 | 9/1973 | Kiel ..................................... 166/308 |
| 3,809,160 | 5/1974 | Routson .............................. 166/294 |
| 3,810,468 | 5/1974 | Harper et al. ....................... 128/156 |
| 3,811,508 | 5/1974 | Friedman ............................ 166/288 |
| 3,826,311 | 7/1974 | Szabo et al. ........................ 166/295 |
| 3,859,107 | 1/1975 | Garcia ................................. 106/123 |
| 3,865,189 | 2/1975 | Friedman ............................ 166/294 |
| 3,866,684 | 2/1975 | Friedman ............................ 166/294 |
| 3,866,685 | 2/1975 | Friedman ............................ 166/294 |
| 3,893,510 | 7/1975 | Elphingstone et al. ............. 166/295 |
| 3,937,283 | 2/1976 | Blauer et al. ....................... 166/307 |
| 3,953,338 | 4/1976 | Straus et al. ...................... 252/8.5 C |
| 3,954,629 | 5/1976 | Scheffel et al. ..................... 252/8.5 |
| 3,978,928 | 9/1976 | Clampitt ............................. 166/294 |
| 3,980,136 | 9/1976 | Plummer et al. ................... 166/280 |
| 3,995,705 | 12/1976 | Fischer et al. ........................ 175/69 |
| 4,021,545 | 5/1977 | Nair et al. ............................ 424/180 |
| 4,036,764 | 7/1977 | Fischer et al. ..................... 252/8.5 C |
| 4,061,580 | 12/1977 | Jahnke ............................... 252/8.55 |

(List continued on next page.)

FOREIGN PATENT DOCUMENTS

| | | |
|---|---|---|
| 197 23 661 A1 | 6/1997 | (DE) . |
| 0 280 341 A1 | 8/1988 | (EP) . |
| 0 399 767 A2 | 11/1990 | (EP) . |
| 0 896 122 A2 | 2/1999 | (EP) . |
| 0 933 414 A1 | 4/1999 | (EP) . |
| 2 116 227 | 9/1983 | (GB) . |
| 2 225 364 | 5/1990 | (GB) . |
| WO 98/54234 | 12/1998 | (WO) . |

OTHER PUBLICATIONS

Holm, "The mechanism of gas and liquid flow through porous media in the presence of foam," Soc. Petroleum Eng. AIME, #SPE 1848, 1967.

Beyer et al. "Flow behavior of foam as well as circulating fluid," Soc. Petroleum Eng. AIME, #SPE 3986, 1972.

Millhone, et al. "Factors affecting foam circulation in oil wells," Soc. Petroleum Eng. AIME #SPE 4001, 1972.

Blauer and Kohlhaas, "Formation fracturing with foam," Soc. Petroleum Eng. AIME, #SPE 5003, 1974.

Holm, "Status of $CO_2$ and hydrocarbon miscible oil recovery methods," Soc. Petroleum Eng. AIME #SPE 5560, 1975.

Essary and Rogers, "Techniques and results of foam redrilling operations–San Joaquin Valley, California," Soc. Petroleum Eng. AIME, #SPE 5715, 1976.

Kanda and Shcechter, "On the mechanism of foam formations in porous media," Soc. Petroleum Eng. AIME, #SPE 6200, 1976.

Aizad and Okandan, "Flow equation for foam flowing through porous media and its application as a secondary recovery fluid," Soc. Petroleum Eng. AIME, #SPE 6599, 1976.

King, "Factors affecting dynamic fluid leakoff with foam fracturing fluids," Soc. Petroleum Eng. AIME, #SPE 6817, 1977.

Rohert, "Stimulation of the niabrara formation using foamed methanol–water," Soc. Petroleum Eng. AIME, #SPE 7174, 1978.

(List continued on next page.)

Primary Examiner—Philip Tucker
(74) Attorney, Agent, or Firm—O'Keefe, Egan & Peterman, LLP

(57) ABSTRACT

Compositions and methods for modifying the permeability of subterranean formations for the purpose of selectively reducing excessive production of aqueous fluids. The compositions include copolymers which may be added to an aqueous fluid to form a water control treatment fluid. The copolymers may include copolymers having a hydrophillic monomeric unit, a first anchoring monomeric unit and a filler monomeric unit, with the first anchoring monomeric unit being based on N-vinylformamide. Additional anchoring monomeric units may also optionally be present. The copolymers may be employed in well treatment fluids introduced into production wells or injection wells. The copolymers may also be utilized in conjunction with stimulation treatments and with introduction of other well treatment fluids.

44 Claims, No Drawings

U.S. PATENT DOCUMENTS

| | | | |
|---|---|---|---|
| 4,088,190 | 5/1978 | Fischer et al. | 166/274 |
| 4,094,795 | 6/1978 | DeMartino et al. | 252/8.55 R |
| 4,137,182 | 1/1979 | Golinkin | 252/8.55 |
| 4,137,400 | 1/1979 | DeMartino et al. | 536/114 |
| 4,148,736 | 4/1979 | Meister | 252/8.55 |
| 4,192,753 | 3/1980 | Pye et al. | 252/8.5 |
| 4,193,453 | 3/1980 | Golinkin | 166/295 |
| 4,282,928 | 8/1981 | McDonald et al. | 166/274 |
| 4,309,523 * | 1/1982 | Engelhardt et al. | 507/221 |
| 4,316,810 | 2/1982 | Burnham | 252/8.55 R |
| 4,328,864 | 5/1982 | Friedman | 166/274 |
| 4,330,450 | 5/1982 | Lipowski et al. | 524/547 |
| 4,336,145 | 6/1982 | Briscoe | 252/8.55 R |
| 4,350,601 | 9/1982 | Mosier et al. | 252/8.55 R |
| 4,357,245 * | 11/1982 | Engelhardt et al. | 507/221 |
| 4,359,391 | 11/1982 | Salathiel et al. | 252/8.55 C |
| 4,361,186 | 11/1982 | Kalina | 166/295 |
| 4,371,443 | 2/1983 | Keeney | 252/8.55 C |
| 4,389,320 | 6/1983 | Clampitt | 252/8.55 R |
| 4,415,463 | 11/1983 | Mosier et al. | 252/8.55 R |
| 4,417,415 | 11/1983 | Cysewski et al. | 47/14 |
| 4,432,881 | 2/1984 | Evani | 252/8.5 |
| 4,451,631 * | 5/1984 | Engelhardt et al. | 507/221 |
| 4,466,890 | 8/1984 | Briscoe | 252/8.55 R |
| 4,476,931 | 10/1984 | Boles et al. | 166/294 |
| 4,487,867 | 12/1984 | Almond et al. | 524/42 |
| 4,488,975 | 12/1984 | Alond | 252/8.455 R |
| 4,499,232 | 2/1985 | Engelhardt et al. | 524/548 |
| 4,500,437 * | 2/1985 | Engelhardt et al. | 507/221 |
| 4,507,440 | 3/1985 | Engelhardt et al. | 525/218 |
| 4,514,309 | 4/1985 | Wadhwa | 252/8.55 R |
| 4,518,040 | 5/1985 | Middleton | 166/307 |
| 4,532,052 | 7/1985 | Weaver et al. | 252/8.55 |
| 4,541,935 | 9/1985 | Constien et al. | 252/8.55 |
| 4,551,513 | 11/1985 | Englehardt et al. | 526/307.1 |
| 4,571,422 | 2/1986 | Symes et al. | 536/114 |
| 4,572,295 | 2/1986 | Walley | 166/295 |
| 4,579,175 | 4/1986 | Grodde et al. | 166/295 |
| 4,615,825 | 10/1986 | Toet et al. | |
| 4,627,495 | 12/1986 | Harris et al. | 166/280 |
| 4,635,726 | 1/1987 | Walker | 166/294 |
| 4,670,501 | 6/1987 | Dymond et al. | 524/458 |
| 4,679,631 | 7/1987 | Dill et al. | 166/307 |
| 4,683,954 | 8/1987 | Walker et al. | 166/307 |
| 4,695,389 | 9/1987 | Kubala | 252/8.55 |
| 4,725,372 | 2/1988 | Toet et al. | 252/8.514 |
| 4,735,731 | 4/1988 | Rose et al. | 252/8.51 |
| 4,779,680 | 10/1988 | Sydansk | 166/300 |
| 4,798,888 | 1/1989 | Symes et al. | 536/123 |
| 4,828,911 | 5/1989 | Morman | 428/288 |
| 4,892,916 | 1/1990 | Hawe et al. | 526/304 |
| 4,913,824 | 4/1990 | Kneller | 210/701 |
| 4,921,621 * | 5/1990 | Costello et al. | 507/221 |
| 4,952,550 | 8/1990 | Wallach et al. | 502/404 |
| 4,975,482 | 12/1990 | Peiffer | 524/535 |
| 5,010,954 | 4/1991 | Falk | 166/295 |
| 5,016,714 | 5/1991 | McCabe et al. | 166/308 |
| 5,028,271 | 7/1991 | Huddleston et al. | 106/720 |
| 5,036,136 | 7/1991 | Peiffer | 524/812 |
| 5,048,607 | 9/1991 | Phelps et al. | 166/270 |
| 5,073,202 | 12/1991 | Wallach | 134/6 |
| 5,086,840 | 2/1992 | Soucemariandan | 166/294 |
| 5,093,448 | 3/1992 | Peiffer | 526/310 |
| 5,103,910 | 4/1992 | Chan | 166/294 |
| 5,111,886 | 5/1992 | Dovan et al. | 166/300 |
| 5,125,456 | 6/1992 | Hutchins et al. | 166/295 |
| 5,128,462 | 7/1992 | Zody | 536/114 |
| 5,145,012 | 9/1992 | Hutchins et al. | 166/292 |
| 5,161,615 | 11/1992 | Hutchins et al. | 166/295 |
| 5,203,834 | 4/1993 | Hutchins et al. | 166/270 |
| 5,207,934 | 5/1993 | Dovan et al. | 252/8.551 |
| 5,211,239 | 5/1993 | Thomas et al. | 166/308 |
| 5,211,858 | 5/1993 | Dovan et al. | 252/8.551 |
| 5,213,446 | 5/1993 | Dovan | 405/128 |
| 5,225,090 | 7/1993 | Hutchins et al. | 252/8.551 |
| 5,226,480 | 7/1993 | Dovan et al. | 166/300 |
| 5,233,032 | 8/1993 | Zody et al. | 536/114 |
| 5,244,042 | 9/1993 | Dovan et al. | 166/270 |
| 5,246,073 | 9/1993 | Sandiford et al. | 166/295 |
| 5,247,995 | 9/1993 | Tjon-Joe-Pin et al. | 166/312 |
| 5,263,540 | 11/1993 | Dovan et al. | 166/278 |
| 5,268,112 | 12/1993 | Hutchins et al. | 252/8.551 |
| 5,278,206 | 1/1994 | Gobel et al. | 524/13 |
| 5,291,949 | 3/1994 | Dovan et al. | 166/295 |
| 5,310,002 | 5/1994 | Blauch et al. | 166/307 |
| 5,310,774 | 5/1994 | Farrar | 524/535 |
| 5,335,733 | 8/1994 | Sandiford et al. | 166/300 |
| 5,360,558 | 11/1994 | Pakulski et al. | 252/8.551 |
| 5,379,841 | 1/1995 | Pusch et al. | 166/295 |
| 5,382,371 | 1/1995 | Stahl et al. | 507/221 |
| 5,386,874 | 2/1995 | Laramay et al. | 166/300 |
| 5,416,158 | 5/1995 | Santhanam et al. | 524/760 |
| 5,417,287 | 5/1995 | Smith et al. | 166/308 |
| 5,418,217 | 5/1995 | Hutchins et al. | 507/222 |
| 5,421,412 | 6/1995 | Kelly et al. | 166/300 |
| 5,465,792 | 11/1995 | Dawson et al. | 166/295 |
| 5,486,312 | 1/1996 | Sandiford et al. | 252/315.1 |
| 5,510,436 * | 4/1996 | Hille et al. | 507/118 |
| 5,529,122 | 6/1996 | Thach | 166/281 |
| 5,559,082 | 9/1996 | Sanner et al. | 507/273 |
| 5,575,335 | 11/1996 | King | 166/280 |
| 5,617,920 | 4/1997 | Dovan et al. | 166/295 |
| 5,701,956 | 12/1997 | Hardy et al. | 166/295 |
| 5,735,349 | 4/1998 | Dawson et al. | 166/295 |
| 5,944,106 | 8/1999 | Dalrymple et al. | 166/281 |
| 5,964,295 | 10/1999 | Brown et al. | 166/295 |
| 5,979,557 | 11/1999 | Card et al. | 166/300 |

OTHER PUBLICATIONS

Komar and Yost, "Practical aspects of foam fracturing in the devonian shale,", *Soc. Petroleum Eng.* AIME, #SPE 8345, 1979.

Leach and Yelling, "Compositional model studies: $Co_2$ oil displacement mechanism,", *Soc. Petroleum Eng.* AIME, #SPE 8368, 1979.

Bernard, et al. "Use of surfactant to reduce $Co_2$ mobility in oil displacement,", *Soc. Petroleum Eng.* AIME, #SPE 8370, 1979.

Driscoll et al, "Oil base foam fracturing applied to the niobrara shale formation,", *Soc. Petroleum Eng.* AIME, #SPE 9335, 1980.

Holcomb et al., "Chemistry, physical nature and rheology of aqueous stimulation foams,", *Soc. Petroleum Eng.* AIME, #SPE 9530, 1981.

Wendorff and Ainley, "Massive hydraulic fracturing of high–temperature wells with stable frac foams,", *Soc. Petroleum Eng.* AIME, #SPE 10257, 1983.

Reidenbach et al., "Rheological study of foam fracturing fluids using nitrogen ad carbon dioxide,", *Soc. Petroleum Eng.* AIME, #SPE 12026, 1983.

Watkins et al., "A new crosslinked foamed fracturing fluid,", *Soc. Petroleum Eng.* AIME, #SPE 12017, 1983.

Maini and Ma, "Relationship between foam stability measured in static tests and flow behavior of foams in porous media,", *Soc. Petroleum Eng.* AIME, #SPE 13073 1984.

Harris and Reidenbach, "High-temperature rheological study of foam fracturing fluids," *Soc. Petroleum Eng.* AIME, #SPE 13177, 1984.

Cameron, et al. "New insights on the rheological behavior of delayed crosslinked fracturing fluids," *Soc. Petroleum Eng.* AIME, #SPE 18209, 1988.

Brannon and Pulsinelli, "Breaker concentrations required to improve the permeability of proppant–packs damaged by concentrated linear and borate–crosslinked fracturing fluids," *Soc. Petroleum Eng.* AIME, #SPE 90–90 (Reprint), 1990.

Bullen, "Combination foam/fluid fracturing," *J. Canadian Petroleum Technology*, pp. 51–56, 1980.

Smith and Holcomb, "Foamed hydrocarbons: an effective and economical alternative to conventional stimulation methods," *Southwestern Petroleum Short Course*, pp. 67–74, No Date Available.

Metzner, "A method for the measurement of normal stresses in simple shearing flow," *Transactions Soc. Rheology*, pp. 133–147 (1961).

Hanks and Bonner, "Transitional flow phenomena in concentric annuli," *Ind. Eng. Chem. Fundam*, 10(1): 105–112, 1971.

Lord et al., "General turbulent pipe flow scale–up correlation for the rheologically complex fluids," *Soc. Petroleum Eng. J*. pp. 252–258, Sep. 1967.

Hanks and Dadia, "Theoretical analysis of the turbulent flow of non–newtonian starris in pipes," *AIChE J.*, 17(3):554–557, May 1971.

Blauer and Holcomb, "Foam fracturing shows success in gas, oil formations," *Oil and Gas Journal*, pp. 57–60, Aug. 4, 1975.

Eakin and Eckard, "Foams Purge Well Bore and Fomation Waters," *Petroleum Engineer*, pp. 71–84, Jul. 1966.

"1: What foam is and how it's used," *World Oil*, pp. 75–77, Nov. 1969.

"2: Stable foam speeds well cleanout," *World Oil*, pp. 78–83, Nov. 1969.

Krug, "Foam pressure loss in vertical tubing," *Oil and Gas Journal*, pp. 74–76, Oct. 6, 1975.

Bentsen and Veny, "Preformed stable foam performance in drilling and evaluating shallow gas wells in Alberta," *J. Petroleum Tech*, pp. 1237–1240, Oct. 1976.

Hanks and Larsen, "The flow of power–law non–netonian fluids in concentric annuli," *Ind. Eng. Chem. Fundam.*, 18(1):33–35, 1979.

Holcomb, "Foam: for fracturing and acid stimulation," *Drilling*, p. 46, Jan. 1982.

Holcomb, "Foam: for fracturing and acid stimulation," *Drilling*, p. 130, Feb. 1982.

Holcomb, "Foam: for fracturing and acid stimulation," *Drilling*, p. 199, May 1982.

"Sand Concentrator for Foam Fracturing," *Canadian Fracmaster, Ltd.*, two pages.

"Surfactants for Oilfield," Witco Oleo/Surfactants Group, 33 pages.

Neill et al., "Field and Laboratory Results of Carbon Dioxide and Nitrogen in Well Stimulation," *J. Petroleum Technology*, pp. 244–248, Mar. 1964.

Rhône–Poulence, *Surfactancts for Energy*, p. 1–5, 1991.

Texaco Chemical Company, *Our Chemical Products*, p. 1–37, 1981.

BJ Technical Tips, "Selective Acidizing Formulation," vol. 7, No. 1, 2 pages (Jun. 1, 1967).

Larry Harrington, "Aquachek" Stimulation Services Product Bulletin No. 750.0.WG, 3 pages (Dec. 1975).

D.D. Dunlap, J.L. Boles, and R.J. Novotny, "Method for Improving Hydrocarbon/Water Ratios in Producing Wells," SPE 14822, pp. 123–130 (1986).

R.J. Novotny, "Candidate Evaluation Technique for Water Control Applications," Conexpo Aprel '92, (1992).

Halliburton's WOR–Con Service—a simple, easy–to–use, effective, long lasting way to help reduce Water–Oil Ratios, No Date Available.

Jimmie D. Weaver, "A New Water–Oil Ratio Improvement Material," SPE 7574 (1978).

Holcomb and Wilson, "Foamed acidizing and selective diverting using stable foam for improved acid simulation," *Southwestern Petroleum Short Course*, pp. 67–74, No Date Available.

"Emulsion Polymers and Emulsion Polymerization," American Chemical Society (ACS) Symposium Series 165 (1981).

John L. Gidley, PhD, et al. *"Recent Advances in Hydraulic Fracturing,"* Henry L. Doherty Memorial Fund of AIME, Society of Petroleum Engineers, 17 pages (1989).

Burnham, Harris, McDaniel, "Developments in Hydrocarbon Fluids for High Temperature Fracturing," Society of Petroleum Engineers of AIME, SPE 7564, pp. 1–7 (includes 4 pages of figures/drawings/tables), 1978.

Bilden, Kesavan, Dawson, "A New Polymer Approach Applicable for the Control of Water Production," Petroleum Network Education Conferences, pp. 1–10 (includes 4 pages of Figures), 1996.

Ash and Ash, "Handbook of Industrial Surfactants: An International Guide to More Than 16,000 Products by Tradename, Application, Composition & Manufacturer," *Gower Publishing Company*, 1993.

* cited by examiner

COMPOSITIONS AND METHODS FOR SELECTIVE MODIFICATION OF SUBTERRANEAN FORMATION PERMEABILITY

The present application claims priority on U.S. Provisional Patent Application Ser. No. 60/111,897 filed Dec. 10, 1998. The entire text of the above-referenced disclosure is specifically incorporated by reference herein without disclaimer.

BACKGROUND OF THE INVENTION

1. Field of the Invention

This invention relates generally to methods and compositions for modifying the permeability of subterranean formations. In particular, this invention relates to methods and compositions for selectively reducing the production of water from subterranean formations by modifying formation permeability using a water control treatment fluid containing a terpolymer in an aqueous-based fluid.

2. Description of Related Art

Production of water and aqueous fluids from oil and gas wells is a common phenomenon which may pose a variety of problems. As hydrocarbons are removed from a producing well, water may begin to move through the formation toward the wellbore where it is produced along with the hydrocarbons. Examples of mechanisms responsible for water production include "coning" into the wellbore from an adjacent water column, and/or movement of water through one or more individual strata completed in the wellbore. Other water production mechanisms, as well as combination of such mechanisms are also possible.

Water production is a phenomenon that typically acts to reduce the amount of oil and/or gas that may be ultimately recovered from a well. In this regard, increasing volumes of water take the place of other fluids that may flow or be lifted from a well, and increase the cost and size of equipment required to separate water from the produced hydrocarbons. Furthermore, operating costs associated with disposal of produced water in an environmentally safe manner typically increase with the volume of produced water, thus increasing the threshold amount of hydrocarbons that must be produced in order to continue economical production of the well. Water production also tends to cause other problems such as scaling of tubulars and surface equipment.

In the past, methods that have been used to control or restrict water production include the gellation of polyvinyl alcohol ("PVA"), polyacrylic acid and the condensation polymerization of phenyl and formaldehyde within formation pore channels. These processes are designed to damage pore channels within the formation matrix and restrict fluid movement through the channels. Another technique involves loading a subterranean area adjacent to the wellbore with a barrier, such as concrete resin or particulate matter, so that the loaded areas are effectively plugged. The area above the loaded area is then perforated to begin production.

In another method, polyacrylamide gels crosslinked with chromium (+3) ions have also been employed. In this case, polyacrylamide may be either a homopolymer or terpolymer. The crosslinking reactions are designed to be slow enough that the fluid may be placed in the reservoir before gellation occurs. The resulting viscous gel is designed to function by blocking or preventing further fluid flow through highly permeable portions of reservoir.

Unfortunately, the above-described conventional water control methods are not selective and may damage both hydrocarbon and water producing pathways. Damage to hydrocarbon-producing pathways is undesirable since it may reduce the well's productivity and profitability.

Other conventional methods have employed high molecular weight polymers in an attempt to achieve selective water control without the necessity of zone isolation methods. Such methods include terpolymers based on polyacrylamide, for example, hydrophillic monomers such as ammonium or alkali metal salts of acrylamidomethylpropane sulfonic acid ("AMPS"). In many cases, these polymers have provided poor performance due to inadequate retention within the formation. Addition of anchoring groups, such as dimethyldiallylammonium chloride, have been used to achieve some improvement in performance, but the resulting polymers may still not be adequately retained.

A further disadvantage to many conventional water control compounds is that they are unstable in acids and heavy brines which are frequently found within oil and gas wells, and/or they may degrade with increased temperature. These characteristics may render the compounds useless in many downhole applications.

SUMMARY OF THE INVENTION

Disclosed are compositions that may be used for selective permeability modification of subterranean formations to reduce or substantially eliminate the amount of water produced from oil and/or gas wells, without substantially affecting the production of hydrocarbons. The disclosed compositions include co-polymers having at least one of N-vinylformamide, N-methylacetamide, and/or N,N-diallylacetamide anchoring groups in combination with at least one hydrophillic monomer, such as a monomer based on AMPS. Other optional anchoring groups, such as sodium acrylate, may also be present in the co-polymers. Optional filler monomeric units may also be present.

In practice, one or more of the disclosed polymers may be introduced into a well as part of an aqueous-based water control treatment fluid to achieve selective permeability modification of a subterranean formation. In this regard, the compositions may be used to substantially reduce the production of water in oil and/or gas wells without substantially effecting the production of associated hydrocarbons. While not wishing to be bound by theory, it is believed that the disclosed polymer compositions interact with hydrocarbon and aqueous formation fluids in different ways, to achieve this advantageous and surprising result without the need for mechanical or other forms of zonal isolation. For example, it is believed that the disclosed polymer compositions containing hydrophillic monomer groups are compatible with areas of the formation in which water is the primary constituent, and are anchored in these areas by the anchoring groups of the polymer. However, it is believed that the disclosed compositions are substantially incompatible with high concentrations of hydrocarbons, and thus tend to degrade, release, or are otherwise ineffective in areas of the formation having relatively large concentrations, or saturation, of hydrocarbons.

Advantageously, the disclosed method and compositions are relatively non-damaging to oil permeability, for example, in oil saturated sandstone while exhibiting the ability to decrease water permeability substantially in water saturated zones. Therefore, the disclosed compositions may be applied successfully to a productive zone without the necessity of mechanical isolation in the wellbore. It will be understood with benefit of this disclosure that mechanical isolation, such as isolation of a water producing section or perforations may be employed if so desired, however, such measures typically add significant costs to a water control treatment. Consequently, treatments utilizing the disclosed method and compositions without mechanical isolation are considerably less expensive than conventional methods which require such measures.

In one respect, disclosed is a method for treating a subterranean formation, including introducing a water control treatment fluid into the formation, the water control treatment fluid including a copolymer and an aqueous base fluid; wherein the copolymer may include a hydrophillic monomeric unit and a first anchoring monomeric unit and wherein the first anchoring monomeric unit may be based on at least one of N-vinylformamide, N-methylacetamide, N,N-diallylacetamide, or a mixture thereof. In one particular embodiment, the first anchoring monomeric unit may be based on N-vinylformamide. The copolymer further may also include a second anchoring monomeric unit based on at least one of dimethyldiallyl ammonium chloride, acrylic acid (such as ammonium or alkali metal salts of acrylic acid), or a mixture thereof. The copolymer further may also include a filler monomeric unit based on acrylamide, methylacrylamide, or a mixture thereof. The hydrophillic monomeric unit may be based on at least one of acrylamidomethylpropanesulfonic acid, acrylic acid, acrylate salt, or a mixture thereof. The hydrophillic monomeric unit may be based on ammonium or alkali metal salts of acrylamidomethylpropanesulfonic acid, and the first anchoring monomeric unit may be based on N-vinylformamide, and the second anchoring monomeric unit may be based on ammonium or alkali metal salts of acrylic acid. The hydrophillic monomeric unit may be based on ammonium or alkali metal salts of acrylamidomethylpropanesulfonic acid, the first anchoring monomeric unit may be based on N-vinylformamide, and the filler monomeric unit may be based on acrylamide. The first anchoring monomeric unit may be N-vinylformamide present in an amount of from about 2% to about 30% by weight of the polymer molecule, and the hydrophillic monomeric unit may be ammonium or alkali metal salt of acrylamidomethylpropane sulfonic acid. The first anchoring monomeric unit may be N-vinylformamide present in an amount of from about 5% to about 15% by weight of the polymer molecule, and the hydrophillic monomeric unit may be acrylamidomethylpropane sulfonic acid. In one embodiment, the copolymer may have a molecular weight of from about 100,000 to about 20 MM. In another embodiment, the copolymer may have a molecular weight of greater than about 100,000.

In the practice of this method, the water control treatment fluid may optionally be a stimulation fluid. The water control treatment fluid may be introduced into the subterranean formation prior to introducing a stimulation fluid into the subterranean formation. The water control treatment fluid further may include a mutual solvent. In one embodiment, the water control treatment fluid may be used to contact the subterranean formation and substantially reduce permeability to water within the formation without substantially reducing permeability to oil within the formation. In another embodiment, the water control treatment fluid may be used to contact the subterranean formation so that it has a post-treatment resistance factor for water of greater than or equal to about 8 and a post-treatment resistance factor for oil of from about 1 to about 2, the resistance factors being measured at a flow rate of from about 1.2 to about 12.2 ml/min/10 cm² area of wellbore.

In one embodiment of this method, the method may further include preparing an aqueous solution of a hydrophillic monomer and first anchoring monomer; and polymerizing the monomers in the solution to form the copolymer; wherein the hydrophillic monomer is at least one of acrylamidomethylpropanesulfonic acid (such as ammonium or alkali metal salt of AMPS), acrylic acid, acrylate salt, or a mixture thereof; and wherein the first anchoring monomer is at least one of N-vinylformamide, N-methylacetamide, N,N-diallylacetamide, or a mixture thereof. In another embodiment, the method may further include preparing an aqueous solution of a hydrophillic monomer, first anchoring monomer, and second anchoring monomer; and polymerizing the monomers in the solution to form the copolymer; wherein the hydrophillic monomer is at least one of ammonium or alkali metal salt of acrylamidomethylpropane-sulfonic acid, acrylic acid, acrylate salt, or a mixture thereof; wherein the first anchoring monomer is at least one of N-vinylformamide, N-methylacetamide, N,N-diallylacetamide, or a mixture thereof; and wherein the second anchoring monomer is at least one of dimethyldiallyl ammonium chloride, ammonium or alkali metal salts of acrylic acid, or a mixture thereof. In another embodiment, the method may further include preparing an aqueous solution of a hydrophillic monomer, first anchoring monomer, and filler monomer; and polymerizing the monomers in the solution to form the copolymer; wherein the hydrophillic monomer is at least one of ammonium or alkali metal salt of acrylamidomethylpropanesulfonic acid, acrylic acid, acrylate salt, or a mixture thereof; wherein the first anchoring monomer is at least one of N-vinylformamide, N-methylacetamide, N,N-diallylacetamide, or a mixture thereof; and wherein the filler monomer is at least one of acrylamide, methacrylamide, or a mixture thereof. The water control treatment fluid may be introduced into an injection well.

Some embodiments of this method may further include pre-hydrolyzing the copolymer prior to introducing the treatment fluid into the formation. The pre-hydrolyzing may include dissolving the polymer in an aqueous solution; adjusting a pH of the treatment fluid to from about 1 to about 3; heating the treatment fluid to a temperature of from about 20° C. to about 100° C.; and neutralizing the treatment fluid to a pH of from about 7 to about 8.5. These embodiments may also further include adjusting the pH of the treatment fluid to below about 8.0, just prior to the introducing and after the hydrolyzing.

In another respect, disclosed is a method for treating a subterranean formation, including introducing a water control treatment fluid into the formation, the water control treatment fluid including a copolymer and an aqueous base fluid; wherein the copolymer includes a hydrophillic monomeric unit, a first anchoring monomeric unit and a filler monomeric unit; and wherein the hydrophillic monomeric unit is based on acrylamidomethylpropanesulfonic acid (such as ammonium or alkali metal salt of AMPS), wherein the first anchoring monomeric unit is based on N-vinylformamide, wherein the filler monomeric unit is based on methylacrylamide, and wherein the alkali metal of the salt is at least one of sodium, potassium, or a mixture thereof. In one embodiment, N-vinylformamide may be present in an amount of from about 2% to about 30% by weight of the polymer molecule. In another embodiment, N-vinylformamide may be present in an amount of from about 5% to about 15% by weight of the polymer molecule. In another embodiment, N-vinylformamide may be present in an amount of from about 2% to about 30% by weight of the polymer molecule; acrylamidomethylpropanesulfonic acid may be present in an amount of from about 0% to about 50% by weight of the polymer molecule; and the methacrylamide filler monomeric unit may be present in an amount of from about 20% to 98% by weight of the polymer molecule. In another embodiment, N-vinylformamide may be present in an amount of from about 5% to about 15% by weight of the polymer molecule; acrylamidomethylpropanesulfonic acid may be present in an amount of from about 20% to about 30% by weight of the polymer molecule; and methacrylamide filler monomeric unit may be present in an amount of from about 40% to about 65% by weight of the polymer molecule.

In the practice of this method, a water control treatment fluid further may include a mutual solvent. The copolymer may be present in the water control treatment fluid in a concentration of from about 500 ppm to about 10,000 ppm. In one embodiment, the copolymer may have a molecular weight of from about 100,000 to 20 MM. Alternatively, the copolymer may have a molecular weight of greater than about 100,000. The water control treatment fluid may optionally be a stimulation fluid. The water control treatment fluid may be introduced into the subterranean formation prior to introducing a stimulation fluid into the subterranean formation. In one embodiment, the water control treatment fluid may be used to contact the subterranean formation and substantially reduce permeability to water within the formation without substantially reducing permeability to oil within the formation. In another embodiment, the water control treatment fluid may be used to contact the subterranean formation, so that thereafter the subterranean formation has a resistance factor for water of greater than or equal to about 8 and a resistance factor for oil of from about 1 to about 2, the resistance factors being measured at a flow rate of about 1.2 to about 12.2 ml/min/10 $cm^2$ area of wellbore.

This method may further include pre-hydrolyzing the copolymer prior to introducing the treatment fluid into the formation. The pre-hydrolyzing may include dissolving the polymer in an aqueous solution; adjusting a pH of the treatment fluid to from about 1 to about 3; heating the treatment fluid to a temperature of from about 20° C. to about 100° C.; and neutralizing the treatment fluid to a pH of from about 7 to about 8.5. The method may further include adjusting the pH of the treatment fluid to below about 8.0, just prior to the introducing and after the hydrolyzing. The method may further include preparing an aqueous solution of a hydrophobic monomer, first anchoring monomer and filler monomer; and polymerizing the monomers in the solution to form the copolymer; wherein the hydrophillic monomer may be acrylamidomethylpropanesulfonic acid (such as ammonium or alkali metal salt of AMPS); wherein the first anchoring monomer may be N-vinylformamide; and wherein the filler monomer may be acrylamide, methylacrylamide, or a mixture thereof. In one embodiment, the monomers may be polymerized to form the copolymer by free radical polymerization, and the polymerization may be initiated by an initiator compound; the initiator compound including at least one of a peroxide, hydroperoxide, persulfate, azo compound, redox initiator, or a mixture thereof. The monomers may be polymerized by gel polymerization.

In another respect, disclosed is a method for treating a subterranean formation, including forming a copolymer by preparing an aqueous solution of a hydrophillic monomer, a first anchoring monomer and a filler monomer; polymerizing the first anchoring monomer, the hydrophillic monomer and the filler monomer in the solution to form the copolymer, wherein the hydrophillic monomer may be acrylamidomethylpropanesulfonic acid (such as ammonium or alkali metal salt of AMPS), wherein the first anchoring monomer may be N-vinylformamide, and wherein the filler monomer may be acrylamide, methylacrylamide or a mixture thereof; wherein N-vinylformamide may be present in an amount of from about 2% to about 30% by weight of the polymer molecule, wherein acrylamidomethylpropanesulfonic acid may be present in an amount of from about 0% to about 50% by weight of the polymer molecule and wherein acrylamide or methacrylamide may be present in an amount of from about 20% to 98% by weight of the polymer molecule; and introducing a water control treatment fluid into the formation, the water control treatment fluid including the copolymer and an aqueous base fluid. In one embodiment, the copolymer may have a molecular weight of from about 100,000 to about 20 MM. In another embodiment, the copolymer may have a molecular weight of greater than about 100,000.

In one embodiment, the water control treatment fluid may optionally be a stimulation fluid. The water control treatment fluid may be introduced into the subterranean formation prior to introducing a stimulation fluid into the subterranean formation. The water control treatment fluid may be introduced into the subterranean formation prior to introducing a hydraulic fracturing fluid into the subterranean formation. In one embodiment, the water control treatment fluid may be used to contact the subterranean formation and substantially reduces permeability to water within the formation without substantially reducing permeability to oil within the formation. In another embodiment, the water control treatment fluid may be used to contact the subterranean formation, so that afterwards the subterranean formation has a resistance factor for water of greater than or equal to about 10 and a resistance factor for oil of from about 1 to about 1.5, each of the water and oil resistance factors being measured at a flow rate of about 1.2 to about 12.2 ml/min/10 $cm^2$ area of wellbore. The water control treatment fluid may be introduced into an injection well. The water control treatment fluid further may include a mutual solvent, and the copolymer may be present in the water control treatment fluid in a concentration of from about 500 ppm to about 10,000 ppm.

In one embodiment of this method, monomers may be polymerized to form the copolymer by free radical polymerization, and the polymerization may be initiated by an initiator compound; the initiator compound including at least one of a peroxide, hydroperoxide, persulfate, azo compound, redox initiator, or a mixture thereof. The monomers may be polymerized by gel polymerization. The initiator compound may be at least one of benzoyl peroxide, diacetyl peroxide, di-t-butyl peroxide, cumene hydroperoxide, hydrogen peroxide, alpha-alpha'-azobis (isobutryonitrile), ammonium or alkali metal salts or peroxydisulfate, or a mixture thereof. The initiator compound may be cumene hydroperoxide. The initiator may be promoted by ethyl acetoacetate. The method may further include pre-hydrolyzing the copolymer prior to introducing the treatment fluid into the formation. The pre-hydrolyzing may include dissolving the polymer in an aqueous solution; adjusting a pH of the treatment fluid to from about 1 to about 3; heating the treatment fluid to a temperature of from about 20° C. to about 100° C.; and neutralizing the treatment fluid to a pH of from about 7 to about 8.5. The method may further include adjusting the pH of the treatment fluid to below about 8, just prior to the introducing and after the hydrolyzing.

In another respect, disclosed is a copolymer formed by a process including combining hydrophillic monomer, first anchoring monomer and filler monomer in an aqueous solution; and polymerizing the monomers in the solution to form the copolymer; wherein the hydrophillic monomer may be at least one of acrylamidomethylpropanesulfonic acid (such as ammonium or alkali metal salt of AMPS), acrylic acid, acrylate salt, or a mixture thereof; wherein the first anchoring monomer may be at least one of N-vinylformamide, N-methylacetamide, N,N-diallylacetamide, or a mixture thereof; and wherein the filler monomer may be at least one of acrylamide, methacrylamide, or a mixture thereof. An alkali metal of the salt of acrylamidomethylpropanesulfonic acid may be at least one of sodium, potassium, or a mixture thereof. The copolymer may be formed by a process further including combining second anchoring monomer in the copolymer solution and polymerizing the monomers, the second anchoring monomer being at least one of dimethyldiallyl ammonium chloride, ammonium or alkali metal salt/s of acrylic acid, or a mixture thereof.

In one embodiment of this copolymer, the first anchoring monomer may be N-vinylformamide. In another embodiment, the first anchoring monomer may be N-vinylformamide, and the N-vinylformamide may be combined with the aqueous solution in an amount of from about 2% to about 30% by weight of the solution. In another embodiment, the first anchoring monomer may be N-vinylformamide, and the N-vinylformamide may be combined with the aqueous solution in an amount of from about 5% to about 15% by weight of the solution. In another embodiment, the hydrophillic monomer may be ammonium or alkali metal salt of acrylamidomethylpropanesulfonic acid, the first anchoring monomer may be N-vinylformamide, and the filler monomer may be acrylamide, methylacrylamide or a mixture thereof. In another embodiment, the first anchoring monomer may be N-vinylformamide, the filler monomer may be acrylamide, methylacrylamide or a mixture thereof; and the hydrophillic monomer may be ammonium or alkali metal salt of acrylamidomethylpropanesulfonic acid. In this embodiment, N-vinylformamide may be combined in an amount of from about 2% to about 30% by weight of the aqueous solution; salt of acrylamidomethylpropanesulfonic acid may be combined in an amount of from about 0% to about 50% by weight of the aqueous solution, and filler monomer may be combined in an amount of from about 20% to about 98% by weight of the aqueous solution. In another embodiment, the first anchoring monomer may be N-vinylformamide, the filler monomer may be acrylamide, methyacrylamide or a mixture thereof; and the hydrophillic monomer may be ammonium or alkali metal salt of acrylamidomethylpropanesulfonic acid. In this embodiment, N-vinylformamide may be combined in an amount of from about 5% to about 15% by weight of the aqueous solution; salt of acrylamidomethylpropanesulfonic acid may be combined in an amount of from about 20% to about 30% by weight of the aqueous solution, and filler monomer may be combined in an amount of from about 40% to about 65% by weight of the aqueous solution. In one embodiment, the copolymer may have a molecular weight of from about 100,000 to about 20 MM. In another embodiment, the copolymer may have a molecular weight of greater than about 100,000. The monomers may be polymerized to form the copolymer by free radical polymerization, and the polymerization may be initiated by combining an initiator compound with the aqueous fluid; the initiator compound including at least one of a peroxide, hydroperoxide, persulfate, azo compound, redox initiator, or a mixture thereof. The monomers may be polymerized by gel polymerization. The initiator compound may be at least one of benzoyl peroxide, diacetyl peroxide, di-t-butyl peroxide, cumene hydroperoxide, hydrogen peroxide, α-α'-azobis(isobutryonitrile), ammonium or alkali metal salts of peroxydisulfate, or a mixture thereof. The initiator compound may be cumene hydroperoxide. The initiator may be promoted by ethyl acetoacetate.

In another respect, disclosed is a copolymer including a first anchoring monomeric unit and a hydrophillic monomer; wherein the hydrophillic monomeric unit may be based on at least one of acrylamidomethylpropanesulfonic acid (such as ammonium or alkali metal salt of AMPS), acrylic acid, acrylate salt, or a mixture thereof; and wherein the first anchoring monomeric unit may be based on at least one of N-vinylformamide, N-methylacetamide, N,N-diallylacetamide, or a mixture thereof. The first anchoring monomeric unit may be based on N-vinylformamide. The copolymer may further include a filler monomeric unit; wherein the filler monomeric unit may be based on at least one of acrylamide, methacrylamide, or a mixture thereof. The first anchoring monomeric unit may be based on N-vinylformamide, and the N-vinylformamide-based monomeric unit may be present in an amount of from about 2% to about 30% by weight of the polymer molecule. The first anchoring monomeric unit may be based on N-vinylformamide, and the N-vinylformamide-based monomeric unit may be present in the copolymer in an amount of from about 5% to about 15% by weight of the polymer molecule.

In one embodiment of this copolymer, the hydrophillic monomeric unit may be acrylamidomethylpropanesulfonic acid, the first anchoring monomeric unit may be based on N-vinylformamide, and the filler monomeric unit may be based on acrylamide, methylacrylamide or a mixture thereof. The first anchoring monomeric unit may be based on N-vinylformamide, the filler monomeric unit may be based on acrylamide, methylacrylamide or a mixture thereof; and the hydrophillic monomeric unit may be based on acrylamidomethylpropanesulfonic acid (such as ammonium or alkali metal salt of AMPS); and the N-vinylformamide-based monomeric unit may be present in the copolymer in an amount of from about 2% to about 30% by weight of the polymer molecule; acrylamidomethylpropanesulfonic acid based monomeric unit may be present in the copolymer in an amount of from about 0% to about 50% by weight of the polymer molecule; and filler monomeric unit may be present in the copolymer in an amount of from about 20% to about 98% by weight of the polymer molecule. In one embodiment, the copolymer may have a molecular weight of from about 100,000 to about 20 MM. In another embodiment, the copolymer may have a molecular weight of greater than about 100,000.

DESCRIPTION OF ILLUSTRATIVE EMBODIMENTS

In one embodiment, the disclosed compositions are copolymers comprising a hydrophillic monomeric unit; at least one first anchoring monomeric unit comprising at least one of N-vinylformamide, N-methylacetamide, and/or N,N-diallylacetamide; and may also include at least one optional selected second anchoring monomeric unit. A filler monomeric unit may also be employed. These copolymer compositions may be advantageously used in aqueous-based water control treatment fluids to selectively control water production from hydrocarbon production wells. As used herein, the term "monomer" refers to molecules or compounds capable of conversion to polymers by combining with other like molecules or similar molecules or compounds. A "monomeric unit" refers to a repeating molecular group or unit having a structure corresponding to a particular monomer. In this regard, the source of a given monomeric unit may or may not be the corresponding monomer itself.

As used herein, the term "monomeric anchoring unit" refers to components of a polymer that will preferentially bind, by either physical or chemical processes, to subterranean formation material and which therefore tend to retain the polymer to the formation material. Anchoring groups are typically selected to prevent a polymer from washing out of the formation due to fluid flow. Primary anchoring sites for the monomeric anchoring units are typically clay and feldspar surfaces existing in formation pores, channels and pore throats. With benefit of this disclosure, those of skill in the art will understand that particularly useful anchoring monomeric units are those having functional groups capable of hydrolyzing to form amine-based anchoring groups on the polymer. Examples include amide-containing monomeric units.

Advantageously, the disclosed co-polymers having the first anchoring monomeric units described herein may be utilized in well treatment methods to selectively reduce the permeability of a subterranean formation to water by a factor of about 10 or more, while at the same time leaving the permeability of the formation to oil virtually unchanged. Furthermore, the disclosed compositions, when introduced into a formation, tend to exhibit a high resistance to removal from water bearing areas of the formation over time.

Hydrophillic monomers may include both ionic and nonionic monomers. The term "nonionic monomer" refers to monomers that do not ionize in aqueous solution at neutral pH. Examples of suitable nonionic hydrophillic monomers include, but are not limited to, acrylamide, N-vinyl pyrrolidone and N-vinylacetamide. Ionic monomers may be either anionic or cationic. Examples of anionic monomers include, but are not limited to, alkaline salts of acrylic acid, ammonium or alkali salts of acrylamidomethylpropane sulfonic acid ("AMPS"), maleic acid, itaconic acid, styrene sulfonic acid, and vinyl sulfonic acid (or its ammonium or alkali metal salts). Examples of suitable cationic monomers include, but are not limited to, dimethyldiallyl ammonium chloride and quaternary ammonium salt derivatives from acrylamide or acrylic acid such as acrylamidoethyltrimethyl ammonium chloride. Further information on monomers and polymer compositions, as well as on well treatment methods employing polymer compositions may be found in U.S. Pat. No. 5,465,792 to Dawson; U.S. Pat. No. 5,735,349 to Dawson; and co-pending patent application Ser. No. 08/869, 388 filed Jun. 5, 1997 and entitled "Compositions and Methods For Hydraulic Fracturing," which are incorporated herein by reference in their entirety.

In one embodiment, one or more hydrophillic monomeric units are typically employed and are based on AMPS (such as at least one of ammonium or alkali metal salt of AMPS, including sodium and/or potassium salts of AMPS), acrylic acid, an acrylic salt (such as sodium acrylate, N-vinyl pyrolidone, ammonium or alkali metal salts of styrene sulfonic acid, etc.), or a mixture thereof. It may be desirable to employ ammonium or alkali metal salts of AMPS for added stability, with or without one or more other hydrophillic monomers, in those cases where aqueous treatment and/or formation fluids contain high concentrations of divalent ions, such as $Ca^{+2}$, $Mg^{+2}$, etc.

Optional second anchoring monomeric units may include any monomeric unit that will adsorb onto formation material. In one embodiment, examples of optional second anchoring monomeric units include at least one of dimethyldiallylammonium chloride, ammonium or alkali metal salts of acrylic acid, (such as sodium salts), or a mixture thereof.

Optional filler monomeric units may include any monomeric unit suitable for copolymerization with the other monomers in the composition. Desirable characteristics of filler monomer units are the ability to retain water solubility and/or relative low cost compared to other monomer units present in a copolymer. Filler monomer units may be based on, for example, monomers such as acrylamide, methylacrylamide, etc. In one embodiment, optional filler monomeric units include monomers such as acrylamide, methylacrylamide, etc.

With benefit of the present disclosure, the disclosed compositions may be prepared using any method suitable for preparing co-polymers known to those of skill in the art. In one embodiment, monomers corresponding to the desired monomeric units in the copolymer are selected and polymerized in an aqueous monomer solution.

In one exemplary embodiment, a first N-vinylformamide monomer is combined with a hydrophillic monomer (such as ammonium or alkali metal salt/s of AMPS) and a filler monomer (such as acrylamides), in an aqueous base fluid, typically water. Other additives may include disodium ethylenediamine tetraacetate ($Na_2EDTA$), pH adjusting chemicals (such as potassium or sodium hydroxide), and a catalyst to initiate polymerization. Monomers with other anchoring groups may also be present.

Any relative proportion of the disclosed monomers that is suitable for polymerization and use in a water control treatment fluid may be combined in an aqueous solution for polymerization. However, in one embodiment, a first anchoring monomer is combined to be present in an amount of from about 2% to about 30% by weight of the total polymer composition, alternatively from about 5% to about 15% by weight of the total polymer composition. In another embodiment a first anchoring monomer is combined to be present in an amount from about 2% to about 30%, alternatively from about 5% to about 15%, by weight of the total polymer composition; ammonium or alkali metal salts of AMPS is combined so that AMPS-based monomer is present in an amount from about 0% to about 50%, alternatively from about 20% to about 30%, by weight of the total polymer composition; and acrylamide is combined to be present in an amount from about 20% to about 98%, alternatively from about 40% to about 65% by weight of the total polymer composition. In one embodiment, N-vinylformamide is utilized as the first anchoring monomer.

Where necessary or desirable, the pH of a monomer solution may be adjusted or neutralized prior to polymerization by, for example, addition of a base such as sodium hydroxide or potassium hydroxide. For example, the pH of an aqueous solution containing ammonium or alkali metal salts of AMPS may be adjusted to, for example, about 10 prior to the addition of N-vinylformamide and/or a second anchoring monomer or a filler monomer such as acrylamide. In one embodiment, a copolymer may be prepared by mixing the appropriate monomers into a tank of fresh water, followed by addition of a $Na_2EDTA$, pH adjuster and catalyst system to initiate polymerization. In one embodiment, ultimate pH range may be from about 6.5 to about 10.0 and alternatively from about 7.5 to about 9.5.

In one embodiment, the disclosed co-polymers may be polymerized from monomers using gel polymerization methods. In any case, polymerization is typically carried out in oxygen free or in a reduced oxygen environment. In this regard, a closed reactors in which oxygen has been removed and the reactor has been sparged and pressured with nitrogen gas, a solution where nitrogen gas is bubbled throughout the reacting solution, or other suitable polymerization methods known in the art may be employed with benefit of this disclosure. If so desired, a water control treatment fluid may be prepared at a well site.

In one embodiment, once the solution is formed by combining hydrophillic monomers, a first anchoring monomer and a filler monomer with an aqueous base fluid, the solution is typically degassed (such as by using nitrogen) and polymerization is initiated with the addition of a catalyst or initiator. It will understood with benefit of the present disclosure that any catalyst or initiator suitable for initiating polymerization of vinyl monomers may be employed including, but not limited to, peroxide, hydroperoxides, persulfates, azo compounds, redox initiators, or mixtures thereof. In this regard, specific examples of suitable catalysts include, but are not limited to, benzoyl peroxide, diacetyl peroxide, di-t-butyl peroxide, cumene hydroperoxide, hydrogen peroxide, $\alpha$-$\alpha'$-azobis isobutryonitrile, ammonium or alkali metal salts of peroxydisulfonic acid, or a mixture thereof. In one embodiment, relatively low dosages of cumene hydroperoxide are employed.

Use of co-catalysts or promoters also may be used to aid in the polymerization of monomers in aqueous solution. Such promoters may act as reducing agents which slow down the release of free radicals, thus favoring a slow buildup of linear high molecular weight polymers. Typical promoters include, but are not limited to, sodium sulfite, tertiary amines and ethyl acetoacetate. These promoters tend to react with a catalyst to promote free radicals so that the rate of polymerization is controlled.

Further information on methods and compositions for use in free radical vinyl polymerization may be found in Chapter 6 of "Polymer Chemistry, an Introduction" (Second Edition by Malcolm V. Stevens, 1990) which is incorporated herein by reference in its entirety.

The disclosed methods and compositions may include polymers of any molecular weight suitable for use in water control applications. In one embodiment, the disclosed co-polymers may be N-vinylformamide-based copolymers having a relatively high molecular weight of greater than about 100,000, and alternatively greater than about 1,000,000 ("MM"). In another embodiment, the molecular weight of the disclosed copolymers may range from about 100,000 to about 20 MM, alternatively from about 1 MM to about 20 MM, and further alternatively from about 2 MM to about 5 MM. It will be understood with benefit of the present disclosure by those of skill in the art that molecular weight may be adjusted to a desired value by varying reacting concentrations (including concentrations of initiator, promoter, and/or chain transfer agents such as thio glycolic acid, etc.). In one embodiment, the polymer concentration during polymerization may range from about 3% to about 45% by weight of solution. In those cases where relatively low polymer concentration percentages are employed, it advantageously allows the product to be sold as a dilute solution without need of isolating the polymer. Such relatively low concentrations include, for example, from about 2% to ye about 10% by weight of solution.

In one embodiment, a subterranean formation may be treated using the disclosed polymer compositions by introducing a water control treatment fluid containing the disclosed compositions into the formation through a wellbore. Such a water control treatment fluid may be formulated with one or more of the disclosed copolymers in combination with an aqueous base fluid. With benefit of this disclosure, an aqueous base fluid may be any aqueous-base fluid suitable for well treatments known in the art including, but not limited to, fresh water, acidified water having pH range from 1.0 to 3.0, brine, sea water, synthetic brine (such as 2% KCl), etc.

If so desired, optional mutual solvents may also be used with the disclosed co-polymers to form a well treatment fluid. Mutual solvents, among other things, may act to remove hydrocarbons adhering to formation material. In this regard, any mutual solvent suitable for solubilizing hydrocarbons may be employed including, but not limited to, terpenes (such as limonene), $C_3$ to $C_9$ alcohols, glycol-ether (such as ethylene glycol monobutyl ether, "EGMBE"), or mixtures thereof.

It will be understood with benefit of the present disclosure that other additives known in the art for use in stimulation and well treatments may be employed in the practice of the disclosed method if so desired. For example, surfactants, thickeners, diversion agents, pH buffers, etc. may be used. In one embodiment, internal diverting materials may be employed if desired. Examples of suitable diverting agents include, but are not limited to, viscous water external emulsions, and are known to those of skill in the art.

In another embodiment, one or more of the disclosed copolymers may be pre-hydrolyzed in acid prior to introduction into a formation as part of a well treatment fluid. This may be accomplished, for example, by dissolving polymer in aqueous solution, followed by addition of an acid (such as hydrochloric acid, formic or acetic acid, etc.) to the polymer solution to lower the pH of the solution, and heating. The polymer solution may then be neutralized with a base (such as sodium hydroxide, etc.), usually after cooling. A salt (such as potassium chloride, ammonium chloride, etc.) may then be added to yield a salt solution of hydrolyzed polymer. In this embodiment, one or more copolymers may be added to an aqueous solution in any desired amount suitable for forming a polymer solution. An aqueous solution may include fresh water or other water-based solutions such as brine, synthetic brines (such as KCl water), sea water, etc.

As an example, one or more copolymers may be added to fresh water to yield a solution having from about 800 to about 2000 parts per million ("ppm") of polymer in the fresh water solution. The solution may then be acidified to a pH of less than about 3, alternatively a pH ranging from about 1 to about 3, followed by heating at a temperature of from about 40° C. to about 70° C., alternatively of about 70° C., for a time sufficient to hydrolyze a portion of the monomeric units. A typical heating time is from about 1 hour to about 12 hours, and alternatively about ten hours. The polymer solution may be neutralized with sodium hydroxide (for example, 25% sodium hydroxide) to a pH of from about 7 to about 8.5. Although not necessary, the solution is typically cooled prior to neutralization (for example to around ambient temperature conditions), so as to reduce vigorousness of the neutralization reaction. Sufficient potassium chloride may be added to yield a salt solution, such as a 2%(wt) salt solution.

To reduce injection pressures during injection of a well treatment fluid including one or more of the disclosed copolymers, the polymer/s may be dissolved in aqueous solution as described above, potassium chloride added, and the pH reduced to a low value, for example to about 1, just prior to introduction of the treatment fluid into a wellbore. Using this optional procedure helps minimize injection pressure and ensure the extent of penetration of the polymer into the formation by allowing hydrolysis of the polymer to occur in situ in the formation. The pH of a well treatment fluid may be lowered by the addition of any acidic material suitable for decreasing pH of the fluid to less than about 3, and alternatively between about 1 and about 3. Suitable acidic materials for this purpose include, but are not limited to, hydrochloric acid, formic acid and acetic acid, etc. With benefit of this disclosure, those of skill in the art will understand that addition of acidic material and adjustment of pH may be varied as desired according to treatment fluid characteristics and formation temperature conditions in order to optimize polymer retention and water control.

A treatment fluid may be batch prepared or prepared by continuous mix processes. For example, the water control treatment fluid may be first prepared in total, and then injected or otherwise introduced into a subterranean formation. This is referred to as a "batch mixing" process. In another embodiment, a water control treatment fluid may be prepared by continuous mix processes, wherein the treatment fluid components are mixed together while the fluid is simultaneously introduced into the wellbore. By "introduced" it is meant that a fluid may be pumped, injected, poured, released, displaced, spotted, circulated or otherwise placed within a well, wellbore, and/or formation using any suitable manner known in the art.

It will be understood with benefit of this disclosure that one or more of the disclosed co-polymers may be added to or combined with an aqueous based fluid at any point prior to introduction into a wellbore, and may be used in all or part of a water control treatment fluid volume. The disclosed copolymer compositions may be used as the only component in an aqueous water control treatment fluid or may be combined with other components of stimulation fluid or other well treatment fluid (such as hydraulic fracturing fluids, acid fluids, surfactant squeeze treatment fluids, etc.).

It will also be understood with benefit of this disclosure that the disclosed copolymer compositions may be mixed with an aqueous base fluid to form a "spearhead" fluid to precede the introduction of a stimulation fluid or other well treatment fluid. This may be done, for example, to achieve diversion of a stimulation fluid into hydrocarbon bearing areas of the formation by virtue of the copolymer's deleterious effect on permeability to water in water bearing areas of the formation. Alternatively, or additionally, the disclosed co-polymers may follow such a well treatment fluid and/or be combined with the body of such a well treatment fluid, or used in any combination thereof. In any case, the introduction of the disclosed polymer compositions into a subterranean formation in conjunction with a well treatment, such as a stimulation treatment, may be used to advantageously place the composition in a position to reduce production of water following the stimulation treatment. Examples of procedural details for use of water control materials in conjunction with well treatments may be found in U.S. patent application Ser. No. 08/869,388 entitled "COMPOSITIONS AND METHODS FOR HYDRAULIC FRACTURING", and filed Jun. 5, 1997 now U.S. Pat. No. 6,169,058, which is incorporated herein by reference in its entirety.

Whether utilized as part of a stand-alone water control treatment fluid, employed in conjunction with another type of well treatment such as a stimulation treatment, or otherwise introduced into a well, the disclosed copolymer compositions may be present in any concentration suitable for controlling water production in a subterranean formation. However, in one embodiment, one or more of the disclosed co-polymers are present in the treatment fluid at a total polymer concentration of from about 500 ppm to about 10,000 ppm polymer, alternatively from about 1000 ppm to about 5,000 ppm polymer. In one embodiment, an aqueous based fluid may be 2% potassium chloride.

Once a treatment fluid is prepared (either by batch or continuous mixing), the water control treatment fluid is introduced into the subterranean formation in any amount suitable for contacting a portion of a reservoir matrix of flow pathways. In one embodiment, an amount of treatment fluid sufficient to treat the entire height of the producing interval having a radius of from about 3 to about 10 foot from the wellbore may be employed, however greater or lesser amounts are also possible.

When employed in conjunction with a non-fracture treatment water control treatment fluid, introduction rates for either batch or continuous mixed water control treatment fluids are typically held below flow rates that would cause pressures to exceed those necessary to fracture the formation being treated. In this regard, flow rates may be adjusted during treatment fluid introduction to ensure that pressures are maintained below those necessary for fracturing.

When used in conjunction with well treatments such as stimulation treatments, treatment fluid introduction flow rates typically depend on the nature of the treatment being performed. For example, in the case of an acid matrix treatment the disclosed copolymer compositions may be included in a "spearhead" fluid ahead of the acid treatment, in the acid treatment (or both), and are typically introduced at a rate below the flow rate necessary to fracture the formation in a manner similar to the rate employed for a water control treatment fluid injected alone. When used in conjunction with a hydraulic fracture treatment, fluid introduction rates (whether utilized as a spearhead, in the fracture treatment fluid, or both) are typically above rates that cause pressures to exceed those necessary to fracture a formation. Whether employed as a stand-alone fluid or in a stimulation fluid (such as an acid fluid or hydraulic fracture fluid), similar concentrations of copolymer compositions are typically employed.

In one water control treatment embodiment for treating a subterranean formation in a production well, the well may be shut-in from about 6 to about 48 hours after introduction of a water control treatment fluid in order to allow maximum anchoring and retention of the disclosed copolymer compositions. Following such a shut-in period, the well may be placed back on production. In another water control treatment embodiment for treating an injection well, a water control treatment fluid may be injected in a manner similar to that described for treatment of a production well, with the exception that the injection well is not typically shut-in after injecting the treatment fluid, but is instead placed back on injection immediately. In this embodiment, the polymer is expected to ultimately improve the water sweep efficiency in the reservoir by reducing water channeling from the injector to surrounding producing wells. Such a condition may be the case, for example, in injection wells where water channeling is suspected to be occurring through high permeability streaks penetrated by the injection well.

With benefit of the present disclosure, it will be understood that the disclosed water compositions when placed in a subterranean formation may induce an artificial pressure barrier and, in the case of the treatment of vertical coning problems, may be placed beyond the wellbore to an area beyond that influenced by the critical draw down pressure responsible for vertical water migration.

Although the disclosed method and compositions may be employed as a water control treatment at any time in the producing life of a production well or the injection life of an injection well, it may be desirable to perform such treatment as soon as a coning or channeling problem (or potential coning or channeling problem) is identified, rather than waiting to the point where coning or channeling becomes severe.

In one embodiment, permeability to water in a subterranean formation may advantageously be reduced without substantially reducing permeability to oil in the formation. In this regard, the measure of reduction of permeability of a subterranean formation to a given fluid may be expressed as the resistance factor, $R_f$. For example, the quotient of permeability to water at irreducible oil saturation prior to treatment ($K_{wi}$) to the permeability to water at irreducible oil saturation after treatment ($K_{wf}$) is defined herein as the resistance factor, $R_f$, for water. In this regard, the disclosed methods and compositions are capable of achieving a water resistance factor, $R_f$, of greater than or equal to about 8, alternatively greater than or equal to about 10, measured at flow rates of from about 0.05 to 6.0 ml/min across a 2.5 cm diameter core.

Similarly, the quotient of permeability to oil at irreducible water saturation before treatment ($K_{oi}$) to permeability to oil at irreducible water saturation after treatment ($K_{of}$) is defined herein as the resistance factor, $R_f$, for oil. Advantageously, the disclosed method and compositions may be used to obtain an oil resistance factor, $R_f$, of from about 1 to about 2, alternatively from about 1 to about 1.5, and alternatively of less than about 2 at flow rates of about 0.05 to 6.0 ml/min across a 2.5 cm diameter core, at the same time the above-described water resistance factors are achieved.

Although exemplary embodiments are described herein, it will also be understood with benefit of the disclosure that the compositions and methods of the present invention may be beneficially employed in any other application where it is desired to inhibit water flow or introduction, or to divert well treatment fluids (such as stimulation fluids) away from water saturated areas of a formation.

EXAMPLES

The following examples are illustrative and should not be construed as limiting the scope of the invention or claims thereof.

Example 1

Polymer Preparation

Into a 500 ml plastic bottle was added 37.53 g of acrylamidomethylpropane sulfonic acid, 100.06 g of DI water, 0.25 g Disodium EDTA, 0.27 g ethyl acetoacetate, 5.03 g acrylic acid and 103.41 g ice. The solution was stirred and the pH slowly adjusted to 10.28 with 31.56 g of 50%(wt) potassium hydroxide. Finally, 77.50 g of acrylamide, 30.00 g of N-vinylformamide, and 110.52 g of DI water were added. The final pH was 9.67.

The bottle was placed in a 1 liter resin kettle, the oxygen in solution was removed by evacuating the kettle three times and sparging with nitrogen. The reaction was initiated with 0.796 g of catalyst solution made from 0.5 g of cumene hydroperoxide dissolved in 19.4 g of t-butyl alcohol. The bath temperature was set to 51° C. and all agitation ceased. After two hours of resonance time, the polymerization occurred with peak temperature of 57.1° C. After cooling, a solution containing 2000 ppm polymer was made and the viscosity was 65 cp at 40 $s^{-1}$ as measured with a Brookfield viscometer.

In this example, acrylic acid was added to the monomer mixture to supply a second anchoring group, sodium acrylate, to the polymer.

Example 2

Core Flow Evaluation

Core flow tests were conducted on 2.5 cm diameter by 4 cm long Berea core having $N_2$ permeabilities of 1000 mD. The test temperature was 85° C. Sequential flows of water and oil were injected through the core. The water composition was 5% (wt) NaCl, 2% (wt) KCl and 1% (wt) $CaCl_2$, and the oil was a 50% (wt) White Mineral Oil in Isopar L™ (Exxon) yielding a viscosity of 1.44 cp. Each fluid was injected while measuring both rate and pressure drop along the length of the core. During injection, each fluid was pumped at varying rates, starting at 0.6 ml/min. After achieving stability, the rate was increased to 2.2 ml/min, 4.0 ml/min, and lastly 6.0 ml/min. The order of injection was water followed by oil, and then back to water. Permeabilities were calculated based on API methods. The permeability to oil at irreducible water saturation, $K_{oi}$, was used as the baseline for comparison to oil permeability after injection of the polymer product composition of Example 1. The permeability of the second water composition injection (at irreducible oil saturation, $K_{wi}$), was used for comparison to water permeability after polymer composition product injection.

After the second water composition injection, the polymer product fluid was injected at 0.6 ml/min in the opposite direction of the previous fluids. In each case, the volume of polymer product was typically five pore volumes. Afterward, core flow was terminated and the core was shut-in for about 12 hours. Then, water composition was pumped in the same direction as the initial injection (and in the opposite direction as the polymer product injection) was re-injected at the four rates described above. The permeability, $K_{wf}$, at each rate was compared to the water permeability at irreducible oil saturation before polymer product objection. The ratio of $K_{wi}$ to $K_{wf}$ was calculated as the resistance factor, $R_f$, for water.

After water injection, oil was again injected at the same four rates. Permeabilities, $K_{of}$, for each rate was compared to the oil permeabilities at irreducible water saturation before polymer product injection. The ratio of $K_{oi}$ to $K_{of}$ is the oil resistance factor, $R_f$, for oil.

In Example 2, the polymer prepared in Example 1 was diluted in DI water to yield a 500 ml. Solution containing 2000 ppm polymer. The pH of the solution was reduced to 1.3 with concentrated HCl and heated to 70° C. for 12 hr. After cooling, the solution was neutralized to pH 7.5 with 50% (wt) NaOH. Lastly, 10.0 g of KCl was added to yield a 2% KCl solution.

After injecting 85 pore volumes of water composition followed by 89 pore volumes of oil and finally another 93 pore volumes of water composition, the polymer product was injected at 0.6 ml./min until five pore volumes had flowed. The core was then shut-in for 12 hr. Water was again flowed through the core and after 144 pore volumes, 85 pore volumes of oil were flowed through the core. Results are shown in Table 1.

The $R_f$ values are shown in Table 2. At low rates, the water $R_f$ value was greater than 10, whereas the oil $R_f$ was less than 2.

TABLE 1

Core Flow Evaluation Results for Example 2

| Phase (Initial) | Rate (ml/min) | Perm (mD) | Phase (Final) | Rate (ml/min) | Perm (mD) |
|---|---|---|---|---|---|
| Oil | 0.56 | 97 | Oil | 0.58 | 70 |
| Oil | 2.18 | 201 | Oil | 2.19 | 189 |
| Oil | 3.93 | 311 | Oil | 4.10 | 310 |
| Oil | 5.49 | 427 | Oil | 5.51 | 406 |
| Water | 0.59 | 74 | Water | 0.44 | 7 |
| Water | 2.34 | 84 | Water | 2.21 | 18 |
| Water | 4.11 | 89 | Water | 4.27 | 32 |
| Water | 5.69 | 91 | Water | 6.03 | 47 |

TABLE 2

Calculated Oil and Water Resistance Factors for Example 2

| Phase | Rate (ml/min) | Water $R_f$ | Phase | Rate (ml/min) | Oil $R_f$ |
|---|---|---|---|---|---|
| Water | 0.50 | 10.57 | Oil | 0.60 | 1.39 |
| Water | 2.20 | 4.67 | Oil | 2.20 | 1.06 |
| Water | 4.10 | 2.78 | Oil | 4.00 | 1.00 |
| Water | 5.80 | 1.94 | Oil | 5.50 | 1.05 |

Example 3

The experiment in Example 2 was repeated with 2000 ppm of higher molecular weight polymer prepared as described in Example 1, but in this case, by reducing the catalyst by 25% and carrying out polymerization at 40° C. The test temperature was 85° C. The results are shown in Table 3. The $R_f$ values are shown in Table 4. The water $R_f$ value at low rates was 17.2, greatly exceeding the value of 10.0. The maximum oil $R_f$ value was 1.34, well below 2.

TABLE 3

Core Flow Evaluation Results for Example 3

| Phase (Initial) | Pore Volume | Rate ml/min | Perm (mD) | Phase (Final) | Pore Volume | Rate (ml/min) | Perm (mD) |
|---|---|---|---|---|---|---|---|
| Oil | 10.0 | 0.62 | 121 | Oil | 13.0 | 0.65 | 90 |
| Oil | 37.0 | 2.22 | 255 | Oil | 39.0 | 2.26 | 209 |
| Oil | 23.0 | 3.93 | 335 | Oil | 60.0 | 4.01 | 315 |
| Oil | 41.0 | 5.64 | 437 | Oil | 29.0 | 5.66 | 457 |
| Water | 23.0 | 0.69 | 189 | Water | 93.0 | 0.64 | 11 |
| Water | 20.0 | 2.37 | 175 | Water | 52.0 | 2.41 | 22 |
| Water | 40.0 | 4.22 | 161 | Water | 25.0 | 4.14 | 31 |
| Water | 54.0 | 6.01 | 117 | Water | 65.0 | 6.07 | 47 |

TABLE 4

Calculated Oil and Water Resistance Factors for Example 3

| Phase | Rate (ml/min) | Water $R_f$ | Phase | Rate (ml/min) | Oil $R_f$ |
|---|---|---|---|---|---|
| Water | 0.65 | 17.18 | Oil | 0.63 | 1.34 |
| Water | 2.40 | 7.95 | Oil | 2.20 | 1.22 |
| Water | 4.20 | 5.19 | Oil | 3.98 | 1.06 |
| Water | 6.10 | 2.49 | Oil | 5.65 | 0.96 |

Although particularly exemplary combinations of monomeric units, monomer solution concentrations, monomeric unit content of polymer, and polymer molecular weights have been described herein, it will be understood by those of skill in the art with benefit of this disclosure that other combinations and ranges of these parameters may be successfully employed in the practice of the disclosed methods and compositions. It will also be understood that any other polymerization or synthesis techniques suitable for forming the disclosed compounds may be employed.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations.

What is claimed is:

1. A method for controlling water by treating a subterranean formation in a production well, comprising:
   introducing a water control treatment fluid into said formation through said production well, said water control treatment fluid comprising a copolymer and an aqueous base fluid;
   wherein said copolymer comprises a hydrophillic monomeric unit and a first anchoring monomeric unit;
   wherein said first anchoring monomeric unit is based on at least one of N-vinylformamide, N,N-diallylacetamide, or a mixture thereof;
   wherein said copolymer comprises an effective amount of said first anchoring monomeric unit so that when said copolymer is present in an aqueous fluid in an amount of about 2000 ppm it is capable of imparting a resistance factor for water of greater than about 10 and a resistance factor for oil of less than about 2 as measured across a Berea core of about 2.5 cm diameter by about 4 cm long and having a permeability to nitrogen of about 1000 md, each of said water and oil resistance factors being measured at a flow rate of about 0.5 ml/min across said Berea core; and
   wherein said water control treatment fluid is introduced at flow rates below a flow rate that would cause pressures to exceed those necessary to fracture said formation.

2. The method of claim 1, wherein said first anchoring monomeric unit is based on N-vinylformamide.

3. The method of claim 1, wherein said copolymer further comprises a second anchoring monomeric unit based on at least one of dimethyldiallyl ammonium chloride, ammonium or alkali metal salts of acrylic acid, or a mixture thereof.

4. The method of claim 1, wherein said copolymer further comprises a filler monomeric unit based on acrylamide, methylacrylamide, or a mixture thereof.

5. The method of claim 1, wherein said hydrophilic monomeric unit is based on an ammonium or alkali metal salt of acrylamidomethylpropanesulfonic acid.

6. The method of claim 1, wherein said hydrophilic monomeric unit is based on at least one of an ammonium or alkali metal salt of acrylamidomethylpropanesulfonic acid, acrylic acid, acrylate salt, or a mixture thereof.

7. The method of claim 1, wherein said hydrophillic monomeric unit is based on an ammonium or alkali metal salt of acrylamidomethylpropanesulfonic acid, wherein said first anchoring monomeric unit is based on N-vinylformamide, and wherein said copolymer further comprises a second anchoring monomeric unit based on ammonium or alkali metal salts of acrylic acid.

8. The method of claim 4, wherein said hydrophilic monomeric unit is based on an ammonium or alkali metal salt of acrylamidomethylpropanesulfonic acid, wherein said first anchoring monomeric unit is based on N-vinylformamide, and wherein said filler monomeric unit is based on acrylamide.

9. The method of claim 1, wherein said water control treatment fluid is a stimulation fluid.

10. The method of claim 1, wherein said water control treatment fluid is introduced into said subterranean formation prior to introducing a stimulation fluid into said subterranean formation.

11. The method of claim 1, further comprising:
preparing an aqueous solution of hydrophilic monomer and first anchoring monomer; and
polymerizing the monomers in said solution to form said copolymer;
wherein said hydrophillic monomer is at least one of on an ammonium or alkali metal salt of acrylamidomethylpropanesulfonic acid, acrylic acid, acrylate salt, or a mixture thereof; and
wherein said first anchoring monomer is at least one of N-vinylformamide, N,N-diallylacetamide, or a mixture thereof.

12. The method of claim 3, further comprising:
preparing an aqueous solution of a hydrophilic monomer, first anchoring monomer, and second anchoring monomer; and
polymerizing the monomers in said solution to form said copolymer;
wherein said hydrophillic monomer is at least one of an ammonium or alkali metal salt of acrylamidomethylpropanesulfonic acid, acrylic acid, acrylate salt, or a mixture thereof;
wherein said first anchoring monomer is at least one of N-vinylformamide, N,N-diallylacetamide, or a mixture thereof; and
wherein said second anchoring monomer is at least one of dimethyldiallyl ammonium chloride, ammonium or alkali metal salts of acrylic acid, or a mixture thereof.

13. The method of claim 3, further comprising:
preparing an aqueous solution of a hydrophilic monomer first anchoring monomer, and filler monomer; and
polymerizing the monomers in said solution to form said copolymer;
wherein said hydrophilic monomer is at least one of an ammonium or alkali metal salt of acrylamidomethylpropanesulfonic acid, acrylic acid, acrylate salt, or a mixture thereof;
wherein said first anchoring monomer is at least one of N-vinylformamide, N,N-diallylacetamnide, or a mixture thereof; and
wherein said filler monomer is at least one of acrylamide, methacrylamide, or a mixture thereof.

14. A method for controlling water by treating a subterranean formation in a production well, comprising
introducing a water control treatment fluid into said formation through said production well, said water control treatment fluid comprising a copolymer and an aqueous base fluid;
wherein said copolymer comprises a hydrophilic monomeric unit, a first anchoring monomeric unit; and a filler monomeric unit;
wherein said hydrophilic monomeric unit is based on acrylamidomethylpropanesulfonic acid, wherein said first anchoring monomeric unit is based on N-vinylformamide, and wherein said filler monomeric unit is based on acrylamide, methylacrylamide or a mixture thereof;
wherein said copolymer comprises an effective amount of said first anchoring monomeric unit so that when said copolymer is present in an aqueous fluid in an amount of about 2000 ppm it is capable of imparting a resistance factor for water of greater than about 10 and a resistance factor for oil of less than about 2 as measured across a Berea core of about 2.5 cm diameter by about 4 cm long and having a permeability to nitrogen of about 1000 md, each of said water and oil resistance factors being measured at a flow rate of about 0.5 ml/min across said Berea core; and
wherein said water control treatment fluid is introduced at flow rates below a flow rate that would cause pressures to exceed those necessary to fracture said formation.

15. The method of claim 14, wherein an ammonium or alkali metal salt of acrylamidomethylpropanesulfonic acid is present in an amount of from about 0% to about 50% by weight of the polymer molecule and wherein said filler monomeric unit is present in an amount of from about 20% to 98% by weight of the polymer molecule.

16. The method of claim 14, wherein an ammonium or alkali metal salt of acrylamidomethylpropanesulfonic acid is present in an amount of from about 20% to about 30% by weight of the polymer molecule; and wherein said filler monomeric unit is present in an amount of from about 40% to about 65% by weight of the polymer molecule.

17. The method of claim 14, wherein said water control treatment fluid further comprises a mutual solvent.

18. The method of claim 14, wherein said copolymer is present in said water control treatment fluid in a concentration of from about 500 ppm to about 10,000 ppm.

19. The method of claim 14, wherein said copolymer has a molecular weight of from about 100,000 to 20 MM.

20. The method of claim 14, wherein said copolymer has a molecular weight of greater than about 100,000.

21. The method of claim 14, wherein said water control treatment fluid is a stimulation fluid.

22. The method of claim 14, wherein said water control treatment fluid is introduced into said subterranean formation prior to introducing a stimulation fluid into said subterranean formation.

23. The method of claim 14, wherein said water control treatment fluid is introduced into an injection well.

24. The method of claim 14, further comprising pre-hydrolyzing said copolymer prior to introducing said treatment fluid into said formation.

25. The method of claim 24 wherein said pre-hydrolyzing comprises:
dissolving said polymer in an aqueous solution;
adjusting a pH of said treatment fluid to from about 1 to about 3;
heating said treatment fluid to a temperature of from about 20° C. to about 100° C.; and
neutralizing said treatment fluid to a pH of from about 7 to about 8.5.

26. The method of claim 24, further comprising adjusting the pH of said treatment fluid to below about 8.0, just prior to said introducing and after said pre-hydrolyzing.

27. The method of claim 14, further comprising:
preparing an aqueous solution of a hydrophilic monomer, first anchoring monomer and filler monomer; and
polymerizing the monomers in said solution to form said copolymer;
wherein said hydrophilic monomer is an ammonium or alkali metal salt of acrylamidacrylamidomethylpropanesulfonic acid;
wherein said first anchoring monomer is N-vinylformamide; and
wherein said filler monomer is acrylamide, methylacrylamide, or a mixture thereof.

28. The method of claim 27, wherein said monomers are polymerized to form said copolymer by free radical polymerization, and wherein said polymerization is initiated by an initiator compound; said initiator compound comprising at least one of a peroxide, hydroperoxide, persulfate, azo compound, redox initiator, or a mixture thereof.

29. The method of claim 28, wherein said initiator compound is at least one of benzoyl peroxide, diacetyl peroxide, di-t-butyl peroxide, cumene hydroperoxide, hydrogen peroxide, alpha-alpha'-azobis(isobutryonitrile), ammonium or alkali metal salts or peroxydisulfate, or a mixture thereof.

30. The method of claim 28, wherein said initiator compound is cumene hydroperoxide.

31. The method of claim 29, wherein said initiator is promoted by ethyl acetoacetate.

32. The method of claim 28, wherein said monomers are polymerized by gel polymerization.

33. A method for treating a subterranean formation, comprising:
introducing a water control treatment fluid into said formation, said water control treatment fluid comprising a copolymer and an aqueous base fluid;
wherein said copolymer comprises a hydrophilic monomeric unit, a first anchoring monomeric unit; and a filler monomeric unit;
wherein said hydrophilic monomeric unit is based on acrylamidomethylpropanesulfonic acid, wherein said first anchoring monomeric unit is based on N-vinylformamide, and wherein said filler monomeric unit is based on acrylamide, methylacrylamide, or a mixture thereof; and
wherein said water control treatment fluid further comprises a mutual solvent.

34. A method for treating a subterranean formation, comprising:
introducing a water control treatment fluid into said formation, said water control treatment fluid comprising a copolymer and an aqueous base fluid;
wherein said copolymer comprises a hydrophilic monomeric unit and a first anchoring monomeric unit;
wherein said first anchoring monomeric unit is based on at least one of N-vinylformamide, N,N-diallylacetamide, or a mixture thereof; and
wherein said water control treatment fluid is introduced into said subterranean formation prior to introducing a stimulation fluid into said subterranean formation.

35. A method for treating a subterranean formation, comprising:
introducing a water control treatment fluid into said formation, said water control treatment fluid comprising a copolymer and an aqueous base fluid;
wherein said copolymer comprises a hydrophilic monomeric unit, a first anchoring monomeric unit; and a filler monomeric unit;
wherein said hydrophilic monomeric unit is based on acrylamidomethylpropanesulfonic acid, wherein said first anchoring monomeric unit is based on N-vinylformamide, and wherein said filler monomeric unit is based on acrylamide, methylacrylamide, or a mixture thereof; and
further comprising pre-hydrolyzing said copolymer prior to introducing said treatment fluid into said formation by:
dissolving said polymer in an aqueous solution;
adjusting a pH of said treatment fluid to from about 1 to about 3;
heating said treatment fluid to a temperature of from about 20° C. to about 100° C.; and
neutralizing said treatment fluid to a pH of from about 7 to about 8.5.

36. The method of claim 1, further comprising placing said production well on production after said water control treatment fluid is introduced into said subterranean formation.

37. The method of claim 36, further comprising shutting-in said production well after introduction of said water control treatment fluid into said subterranean formation and prior to placing said production well on production.

38. The method of claim 14, further comprising placing said production well on production after said water control treatment fluid is introduced into said subterranean formation.

39. The method of claim 38, further comprising shutting-in said production well after introduction of said water control treatment fluid into said subterranean formation and prior to placing said production well on production.

40. The method of claim 34, wherein said copolymer further comprises a filler monomeric unit; and wherein said hydrophilic monomeric unit is based on acrylamidomethylpropanesulfonic acid, wherein said first anchoring monomeric unit is based on N-vinylformamide, and wherein said filler monomeric unit is based on acrylamide, methylacrylamide, or a mixture thereof.

41. A method for treating a subterranean formation, comprising:
introducing a water control treatment fluid into said formation, said water control treatment fluid comprising a copolymer and an aqueous base fluid;
wherein said copolymer comprises a hydrophillic monomeric unit and a first anchoring monomeric unit;
wherein said first anchoring monomeric unit is based on at least one of N-vinylformamide, N,N-diallylacetamide, or a mixture thereof; and
wherein said copolymer further comprises a second anchoring monomeric unit based on at least one of dimethyldiallyl amnonium chloride, ammonium or alkali metal salts of acrylic acid, or a mixture thereof.

42. The method of claim 41, wherein said hydrophillic monomeric unit is based on an ammonium or alkali metal salt of acrylamidomethylpropanesulfonic acid, wherein said first anchoring monomeric unit is based on N-vinylformamide, and wherein said second anchoring monomeric unit is based on ammonium or alkali metal salts of acrylic acid.

43. The method of claim 41, further comprising: preparing an aqueous solution of a hydrophilic monomer, first anchoring monomer, and second anchoring monomer; and
polymerizing the monomers in said solution to form said copolymer;

wherein said hydrophillic monomer is at least one of an ammonium or alkali metal salt of acrylamidomethyl-propanesulfonic acid, acrylic acid, acrylate salt, or a mixture thereof;

wherein said first anchoring monomer is at least one of N-vinylformamide, N,N-diallylacetamide, or a mixture thereof; and wherein said second anchoring monomer is at least one of dimethyldiallyl ammonium chloride, ammonium or alkali metal salts of acrylic acid, or a mixture thereof.

44. The method of claim 41, further comprising:

preparing an aqueous solution of a hydrophilic monomer, first anchoring monomer, and filler monomer; and polymerizing the monomers in said solution to form said copolymer;

wherein said hydrophilic monomer is at least one of an ammonium or alkali metal salt of acrylamidomethyl-propanesulfonic acid, acrylic acid, acrylate salt, or a mixture thereof;

wherein said first anchoring monomer is at least one of N-vinylformamide, N,N-diallylacetamide, or a mixture thereof; and wherein said filler monomer is at least one of acrylamide, methacrylamide, or a mixture thereof.

* * * * *

UNITED STATES PATENT AND TRADEMARK OFFICE
CERTIFICATE OF CORRECTION

PATENT NO.    : 6,228,812 B1
DATED         : May 8, 2001
INVENTOR(S)   : Jeffrey C. Dawson et al.

It is certified that error appears in the above-identified patent and that said Letters Patent is hereby corrected as shown below:

Column 19, claim 13,
Line 58, delete "diallylacetamnide," and insert -- diallylacetamide --.

Column 21, claim 27,
Lines 7-8, delete "acrylamidacrylamidomethylpropanesulfonic" and insert -- acrylamidomethylpropanesulfonic --.

Signed and Sealed this

Eighth Day of January, 2002

*Attest:*

*Attesting Officer*

JAMES E. ROGAN
*Director of the United States Patent and Trademark Office*